E. A. & G. Platt,
Well Tubing,
N° 80,875. Patented Aug. 11, 1868.

Witnesses:

Inventor:
Edwin A. Platt
George Platt  his X mark

United States Patent Office.

EDWIN A. PLATT, OF BRISTOL, AND GEORGE PLATT, OF EAST HARTFORD, ASSIGNORS TO THEMSELVES AND LINUS WILCOX, OF MIDDLETOWN, CONNECTICUT.

Letters Patent No. 80,875, dated August 11, 1868.

IMPROVEMENT IN WELL-TUBES.

The Schedule referred to in these Letters Patent and making part of the same.

TO ALL WHOM IT MAY CONCERN:

Be it known that we, EDWIN A. PLATT, of Bristol, and GEORGE PLATT, of East Hartford, both in the county of Hartford, and State of Connecticut, have invented certain new and useful Improvement in Tubular Wells; and to enable others skilled in the art to make and use the same, we will proceed to describe its construction and operation by referring to the drawings, in which the same letters indicate like parts in each of the figures.

The nature of this invention will be understood from the specification and drawings.

The object desired to be attained thereby is to provide a free flow of water, and, at the same time, to prevent dirt from packing at the lower end of the tube.

In the accompanying drawings—

Figure 1:
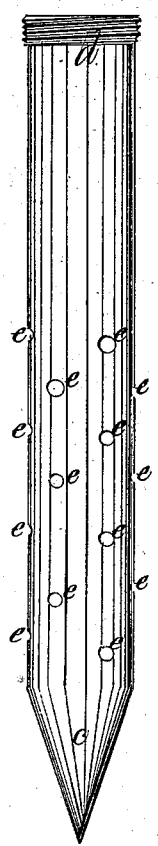
Figure 1 is a side view of a section of tube.
Figure 2:
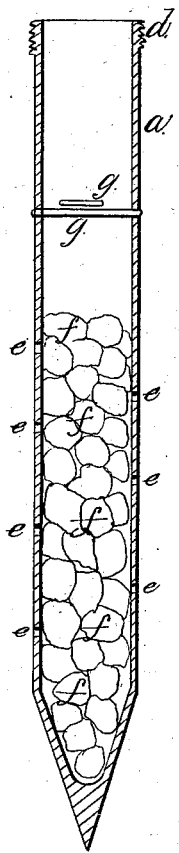
Figure 2 is a sectional view of the same.

$a$ is a section of a well-tube, which may be of any given size. One end, $c$, is pointed, or formed conical shape, for the purpose of facilitating and directing its course while being driven into the ground. This shape may be produced by securing a conical-shaped piece to the end of the pipe, or it may be produced by closing up, welding, and drawing down the metal to a point.

The upper end of this section of pipe is provided with a screw-thread, $d$, for the purpose of uniting one piece of pipe after another until driven to the desired depth, as in the usual way.

The lower section, or the pointed end of this pipe, is perforated on all sides, for some distance upward from the pointed end. The object of these holes is to allow a free flow of fluid through from the outside to the inside of the tube.

The inside of this tube, from the bottom to a little distance above the perforations $e$, is provided with balls or pebbles, $f$, which are secured in place within the tube by means of an impediment, such as, for example, the bars $g$, in such a way as to allow them to play up and down by the action of the pump or agitation of the fluid.

Thus the pipe may be driven to any desirable depth, good provision made for keeping in good working condition, and cheap and simple of construction.

We believe we have thus shown the nature, construction, and advantage of this invention so as to enable others skilled in the art to make and use the same therefrom.

It is not in the slightest degree our object to filter the water which passes through the openings $e$ into the pipe $a$, but, on the other hand, it is the express object of the pebbles $f$ not to filter, but to keep the passage in close proximity with the perforations $e$ open and free for the passage of water, and, by the action of the pump and agitation of water, to effectually prevent the clayey or earthy particles from becoming embedded at this point, (the lower end of the pipe.) We use coarse pebbles, and those only, and by the use of which we keep the pipe open, and secure a perfectly free passage of water.

We claim a well-tube, having lateral perforations and pebbles caged in the lower section, when so arranged that the pebbles shall be moved in their position by the action of the pump, all substantially as and for the purpose described.

EDWIN A. ✕ PLATT. [L. S.]
his mark.
GEORGE PLATT. [L. S.]

Witnesses:
E. W. BLISS,
J. W. BLISS.